United States Patent [19]

Weber

[11] Patent Number: 4,528,620

[45] Date of Patent: Jul. 9, 1985

[54] AUDIO LIGHT CHANDELIER

[75] Inventor: Franz K. Weber, Canoga Park, Calif.

[73] Assignee: Modulite Corporation, Los Angeles, Calif.

[21] Appl. No.: 572,939

[22] Filed: Jan. 23, 1984

[51] Int. Cl.³ .............................................. H04M 1/22

[52] U.S. Cl. ...................................... 362/86; 362/147; 362/234; 362/249; 362/252; 362/294; 362/310; 362/367; 362/368; 362/373; 362/404; 362/405; 362/455; 362/806; 362/253

[58] Field of Search ................. 362/147, 86, 249, 253, 362/234, 252, 310, 294, 367, 368, 373, 404, 405, 455, 806

[56] References Cited

U.S. PATENT DOCUMENTS 4,044,246 8/1977 Docimo et al. ..................... 362/294

4,433,363 2/1984 Weber .................................. 362/86

*Primary Examiner*—Stephen J. Lechert, Jr.

*Attorney, Agent, or Firm*—Gene W. Arant; Paul H. Ware

[57] ABSTRACT

An improved audio chandelier that has, in addition to its conventional illuminating purpose, an audio system such as a stereophonic radio or a security system incorporated into its structure, the former to furnish, for example, music, while the latter has as its purpose to warn of unwanted intrusions and disasters, for example, such as fires, by means of stimulus-responsive warning signals. Ventilation is provided for cooling the various systems components. Control, sensing and energizing means may be provided within a common housing. The modular construction of the device makes assembly and disassembly convenient without the use of special or any other kinds of tools. Ventilation by natural convection maintains electronic and electrical systems within acceptable operating temperatures.

9 Claims, 2 Drawing Figures

AUDIO LIGHT CHANDELIER

CROSS REFERENCE TO RELATED APPLICATIONS

This application is an improvement of my presently pending application Ser. No. 06/386,695, filed 06/09/82 now U.S. Pat. No. 4,433,363. I claim the advantage of the filing date of that prior application.

BACKGROUND OF THE INVENTION

Within the context of present technology it has been traditional to maintain each of lighting, audio, security and other entertainment and warning systems in separate physical housings and to energize and control each such system from its own separate physical location. It has not been the practice to centralize the physical housing, location and control of these kinds of systems. The purpose of a device such as is contemplated by the present invention is to combine the functional operations of lighting, audio and/or security systems in one conventional-appearing decorative housing such that the entertainment aspect of a stereo radio receiver may be controlled and enjoyed along with the control and enjoyment of lighting and security systems. According to the present invention, a system is provided in which audio, lighting and/or security systems may be combined in one decorative housing that will be useful in homes, industrial plants and the like, housed in an economical and convenient central control station. In a high-density packaging of system components such as is contemplated by the present invention, the provision of adequate ventilation is of the first order of importance.

The general form of the audio light chandelier may include a plurality of horizontal arms, usually disposed at about equal angular intervals about a central housing member or chimney. Decorative appearance is almost as important an aspect of any lighting fixture as is functional operation and this is particularly true for a chandelier. An important functional and utilitarian feature of the audio light chandelier is its utilization of the structure supporting the light fixtures as resonance chambers for an included audio system. Another important feature is in the provision of openings in the body of the device for the circulation of cooling air. Natural convection is used to maintain a flow of cooling air through the body of the device so as to remove the heated air, so heated by the electronic and electric components of the system, and to introduce fresh air from the room in which the structure is located.

SUMMARY OF THE INVENTION

The audio light chandelier of the present invention is constructed in a modular fashion wherein an open-ended central housing member or chimney supports a number of arms such that included systems may all be controlled from a central location within the general housing thereof. Assembly of modules is straightforward and may be accomplished by any person possessing average dexterity.

In the preferred form of the invention, the structure of the chandelier is supported by a hang chain which may be suspended from a ceiling and which hang chain is in turn connected to a transition link supporting the central housing member. A central support tube forms a part of the structure providing an opening at the top of the main central body of the chandelier thus providing for the flow of air through the central housing member by means of a chimney effect. In general, the system-carrying chandelier arms are disposed in an axial direction normal to the open-ended central housing member. These arms are provided with intake openings to permit the ingress of cooling air. It is contemplated that the central housing member contain the systems controls that may be manipulated from underneath the structure and that the lighting, audio and/or sensing output portions of the structure will be mounted in the horizontal arms. An important feature of the invention is that all the incorporated systems may be controlled from the central location provided in the housing member.

An additional important feature of the invention is that the same mechanical structure that physically supports the lighting feature of the chandelier also provides resonance chambers for the audio systems of the device.

DRAWING SUMMARY

PREFERRED EMBODIMENT

Figures 1, 2:
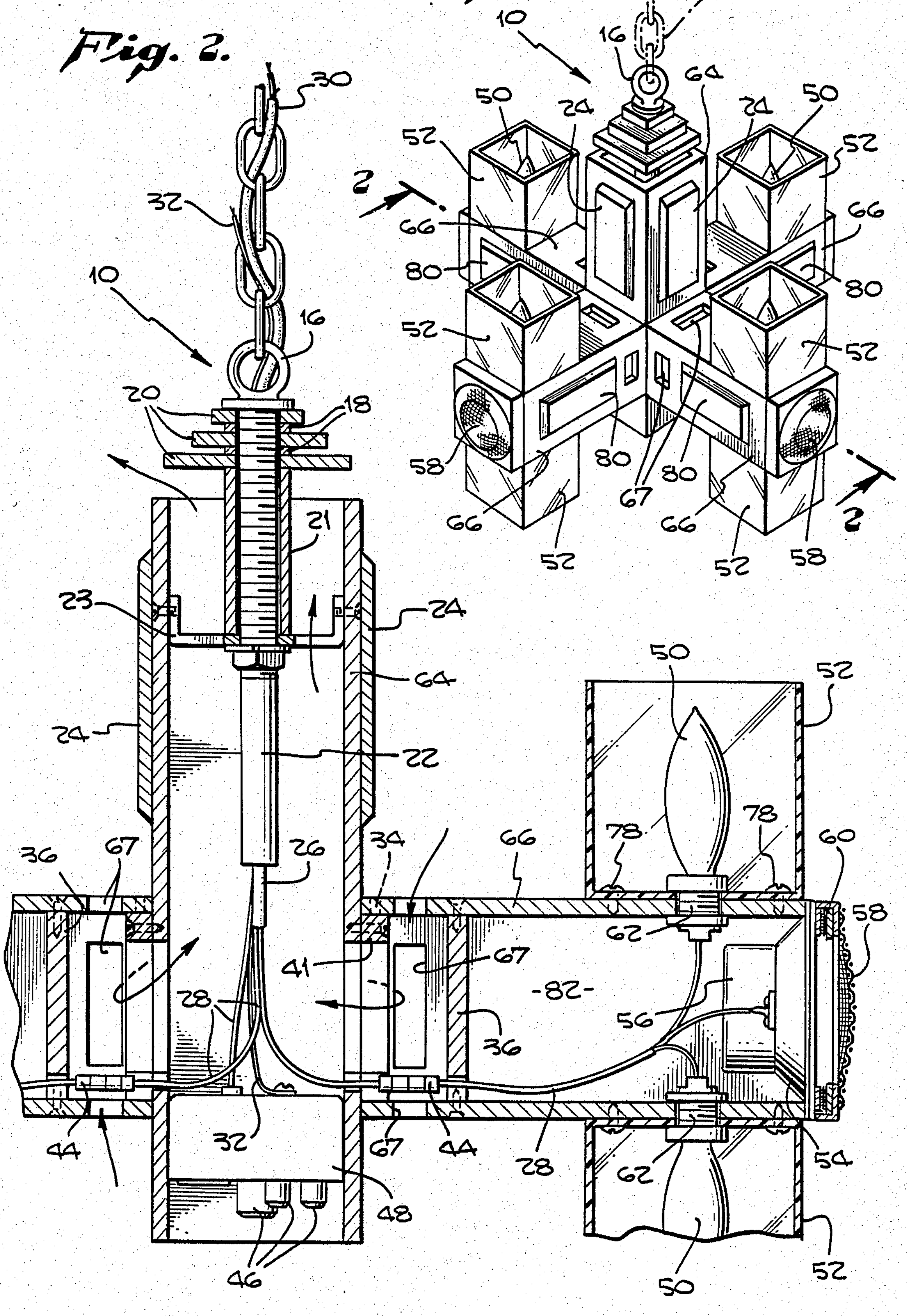
FIG. 1 is an idealized perspective view of a ceiling mounting device such as is contemplated by the invention.
FIG. 2 is an enlargement in cutaway cross-section taken along the sight lines 2—2 of FIG. 1 showing representative wiring details and the elements of the ventilation scheme contemplated.

Advantages and features of the present invention will be fully apparent to those skilled in the art to which the invention pertains from the ensuing detailed description thereof regarded in conjunction with the accompanying drawings.

Although a specific embodiment of the invention will be described with reference to the drawings, it should be understood that such embodiment is by way of example only and merely illustrative of the many possible specific embodiments which can represent applications of the principles of the invention. Various changes and modifications, obvious to one skilled in the art to which the invention pertains, are deemed to be within the spirit, scope and contemplation of the invention as further defined in the appended claims.

Referring to FIG. 1 with greater particularity there is shown an idealized perspective of a ceiling mounted device such as is contemplated by the invention. A hang chain 12, attached to a ceiling, supports a transition link 16 which through its internal mechanism supports a vertical open-ended central housing member or chimney 64. The vertical central housing member 64 incorporates decorative panels 24. It has been previously noted that the aesthetic aspect of chandeliers such as the one presented herein is of primary importance, thus, the decorative panels 24 as shown in the vertical member and decorative panels 80 as shown in the horizontal members. Ventilation openings 67 are shown in the arms and serve to admit cooling air to the central housing member 64. Upon being heated by radiations from the systems electronic and electrical components, the heated air is expelled through the top of the central housing as indicated by the arrows.

For illustrative purposes and by way of example, the embodiment shown contemplates four horizontal arms radially disposed with respect to the axis of a central vertical member. Each radial arm 66 of the device as shown supports two lighting fixtures. Lampshades 52 may be fabricated of glass, thermal setting plastic, or of some such convenient material. In addition, each radial arm may include sensing and audio system components. Each arm includes ventilation openings or slots for the intake of cooling air from the surrounding environment. There is also shown a typical decorative cover for the audio system devices which cover is denoted by the numeral 58.

Referring now to FIG. 2, it may be observed that power cable 30 and antenna 32, have been threaded through hang chain 12 and through transition link 16 so as to be disposed within the interior of central housing member 64. It may be noted that cable sheath 26 has been extended so as to protect the incorporated cables denoted by the numeral 28 and which numeral identifies the power and accessory control cables provided for operation of the system.

Typical horizontal arm 66 may typically be disconnectedly attached to central housing member 64 by means of hang block 40, itself attached to central housing member 64 by means of screws 42 and having incorporated into its structure holding pins 34 for the attachment of said horizontal arm 66. The horizontal arms have position holes located so as to accept the holding pins 34 and to retain said horizontal arm in cantilevered engagement with said vertical central housing member 64. Before attachment of representative horizontal arm 66, electrical and signal connections may be made to the central housing system by means of typical connectors 44. A support bracket 23 locates central support tube 21 so that in cooperation with the other internal structure, an opening is maintained at the top of the central housing member or chimney.

It is well known in the audio art that resonance acoustic cavities having various physical lengths are responsive in a selective manner to the higher or lower sound frequencies in proportion to those lengths. If FIG. 2 such a resonance acoustic cavity 82 is defined by first low frequency baffle member 36, situated as shown and the audio output device or loudspeaker 54 located near to the other longitudinal extremity of low frequency resonance acoustic cavity 82. Numeral 58 denotes a decorative cover for the audio output device 54. As shown in the Figure this decorative cover 58 may be attached to the end of horizontal arm 66 by means of Velcro pads 60. Velcro is a trademark of Velcro U.S.A., Inc. An electro audio transducer for audio output device 54, transducing mechanical energy into electrical energy or electrical energy into mechanical energy, as the case may be, and as has been well demonstrated in the art, is denoted by the numeral 56.

For purposes of furnishing light, a light fixture comprising a lamp 50 situated in a lamp socket 62 and covered by lamp shade 52 may be attached to horizontal arm 66 by means of fastening screws 78. Second low frequency baffle 36 is shown in the oppositely located horizontal arm. Numeral 48 denotes the housing for audio and detection systems as contemplated by the invention while the system controls are denoted generally by numeral 46.

Ventilation of systems electronic and electrical components is accomplished by means of positive flow of ambient air. This positive flow may be traced from the ventilation openings 67 through the interior of the central housing member or chimney 64, through reticulated bracket 23 and out of the top of the central housing member 67. The top of central housing member 67 is maintained open by the cooperation of reticulated bracket 23 in supporting central support tube 21 as attached in the upper interior of the central housing member. This cooperation maintains the lower of space blocks 20 in an adjustable separation from the top of central housing member 64. During operation, normal heating of systems electronic and electric components, especially in housing 48, will cause occupying air to be expelled out of the top of central housing member 64. In turn, ambient air from the surrounding environment will be drawn into ventilation openings 67 to join the positive flow out of the top of central housing member 64. As a further result of this positive flow of air, that air resident in the horizontal arms 66 will also be drawn into the air current caused by the chimney effect of the air-flow up through housing member 64. The overall result is apparently a positive cooling of all parts of the device which contributes materially to operating efficiency, longevity and reliability of all components of the system.

Thus there has been shown a system that may be highly decorative, that may be assembled by an ordinary customer by means of attaching the horizontal arms to the open-ended central housing member by means of hang blocks, pins an position holes, and which may incorporate an audio system as well as an illumination system. While not specifically shown in the present drawings, said audio system may be utilized for purposes of entertainment, such as music, warning of a hazardous condition such as smoke or fire and/or for purposes of warning of an unwanted intrusion, in accordance with the well-known art. The centralization of control and location of these systems has been shown through the novel advantages of the invention.

It is here pointed out that although the present invention has been shown and described with reference to a particular embodiment, nevertheless, various changes and modifications obvious to one skilled in the art to which the invention pertains are deemed to lie within the purview of the invention.

What is claimed and desired to be secured by Letters Patent of the United States is:

1. A composite illumination and audio system comprising, in combination:
   - a mechanical structure adapted to be suspended from a wall or ceiling in spaced relation thereto;
   - an illuminating system supported by said mechanical structure;
   - an audio system also supported by said mechanical structure;
   - said mechanical structure providing a resonant cavity for said audio system;
   - an electrical power supply circuit for furnishing electrical power both to said illuminating system and to said audio system; and
   - a chimney providing a positive air-flow ventilation system to provide air cooling for said illuminating system, said audio system and said electrical power supply circuit.

2. An audio light chandelier adapted to be suspended from a wall or ceiling in spaced relation thereto which comprises:
   - a central chimney;
   - means for mounting said chimney to a wall or ceiling in spaced relation thereto;
   - means to supply electrical power to be distributed into said chimney;
   - radio signal sensing means distributed into said chimney;
   - an audio and detection system connected and responsive to said radio signal sensing means;

means to control said audio and detection system;

a plurality of horizontal arms radially disposed with respect to the axis of said chimney and disconnectedly attached thereto;

at least one lighting fixture attached to each of said horizontal arms;

a resonance acoustic cavity formed within the interior dimensions of said horizontal arms;

an electro-audio transducer situated in each of said horizontal arms;

ventilator openings in said horizontal arms to provide for the intake of ambient air; and an open space at the upper extremity of said chimney providing for the expulsion of said air whereby said audio and detection system and said at least one lighting fixture may be continuously cooled when in operation by the positive flow of air through said chimney.

3. The audio light chandelier of claim 2 wherein said horizontal arms are disconnectedly attached to said chimney by means of:

hang blocks in turn attached to said chimney by means of screws; and holding pins for cantileveredly securing said horizontal arms to said chimney through the use of position holes located in said horizontal arms.

4. The audio light chandelier of claim 2 wherein said means to supply electrical power includes connection means for distributing said electrical power into said horizontal arms.

5. The audio light chandelier of claim 2 wherein said resonance acoustic chamber includes a baffle, location of which determines the acoustic response characteristics of said resonance acoustic chamber.

6. A composite illumination and audio system comprising, in combination:

a hollow open-ended central housing member;

means for suspending said central housing member from above in spaced relation from a wall or ceiling;

a plurality of horizontally disposed hollow arms secured to and extending radially outward from said central housing member in symmetrically arranged positions;

ventilation openings in said horizontally disposed hollow arms;

a plurality of loudspeakers, each secured within the outer end of a corresponding one of said arms;

each of said arms containing an interior baffle, said baffle and the associated loudspeaker forming a resonance chamber within said arm;

a set of lamp holders, each being supported on the outer end of one of said arms and extending vertically therefrom;

music circuit means disposed within said central housing member and electrically coupled to all of said loudspeakers; and energizing circuit means contained within said suspending means and coupled to said music circuit means for energizing the same, and also coupled through said central housing member and said arms to each of said lamp holders for providing energy thereto.

7. In the combined illumination and audio system of claim 6:

an elongated hollow arm;

ventilation openings in said hollow arm;

means for releasably attaching one end of said arm to an open-ended central housing member;

a loudspeaker disposed within and secured to the other end of said arm;

a baffle transversely disposed within said arm, said baffle and loudspeaker together forming a resonance chamber;

said arm having an opening in its side wall;

a lamp socket supported in said side wall opening;

said baffle having an opening therein; and an electrical cable extending from said one end of said arm through said baffle opening towards said other end of said arm, and being connected to both said lamp socket and said loudspeaker.

8. Apparatus as claimed in claim 7 wherein said arm is of rectangular cross-sectional configuration and has walls made of wood.

9. Apparatus as claimed in claim 6 which further includes control means positioned on the bottom of said open-ended central housing member for controlling said music circuit means.

* * * * *